March 18, 1941.  S. T. MORELAND  2,235,324

METHOD OF PREHEATING MOLDABLE MATERIALS
Filed Oct. 14, 1937

INVENTOR.
S. T. Moreland,
BY Rulz, Hoge
ATTORNEYS.

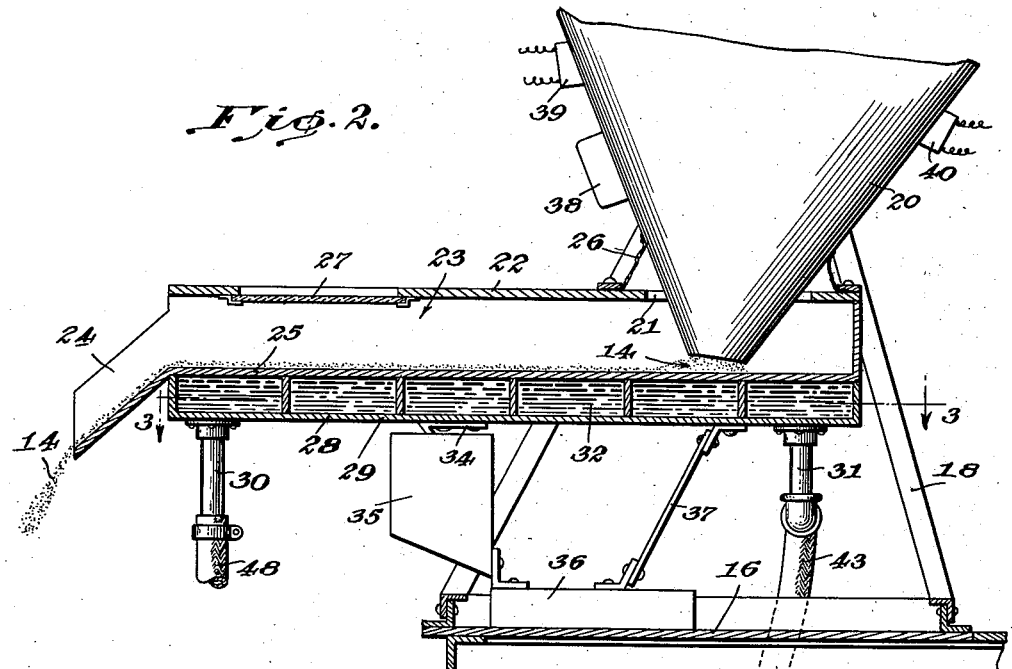
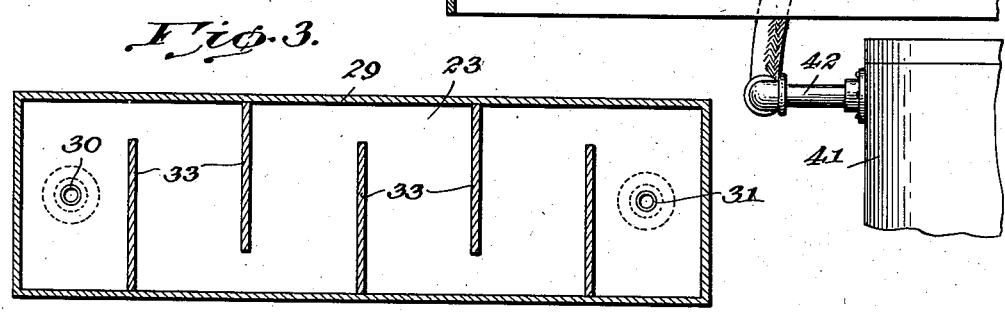
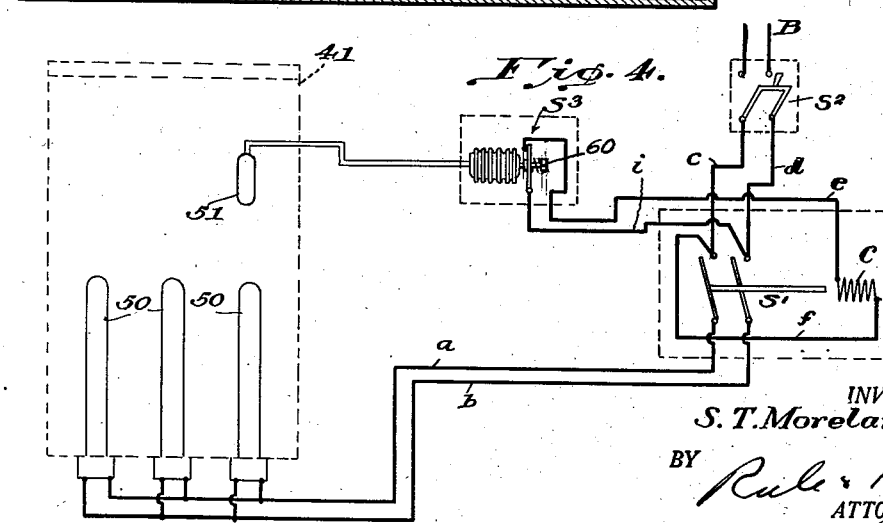

Patented Mar. 18, 1941

2,235,324

UNITED STATES PATENT OFFICE 2,235,324

METHOD OF PREHEATING MOLDABLE MATERIALS

Stephen T. Moreland, Toledo, Ohio, assignor to Owens-Illinois Glass Company, a corporation of Ohio Application October 14, 1937, Serial No. 169,076

1 Claim. (Cl. 18—55)

The present invention relates to a method of preheating moldable materials prior to their introduction to a molding machine in order that the duration of the molding cycle in the machine may be materially lessened.

Another object of the invention is to provide a method and apparatus of the character set forth above in which the temperature of the moldable materials is gradually, uniformly, and progressively raised to a predetermined degree by a direct heat transfer process.

Other objects of the invention, not at this time enumerated, will become apparent hereinafter.

In the accompanying drawings:

Fig. 2 is a fragmentary side elevational view of a portion of the apparatus, certain parts thereof being shown in vertical section to more clearly reveal the nature of the invention;

Fig. 3 is a sectional view taken substantially along the line 3—3 of Fig. 2; and Fig. 4 is a diagrammatic view illustrating an electrical temperature control circuit employed in connection with the invention.

Figure 1:
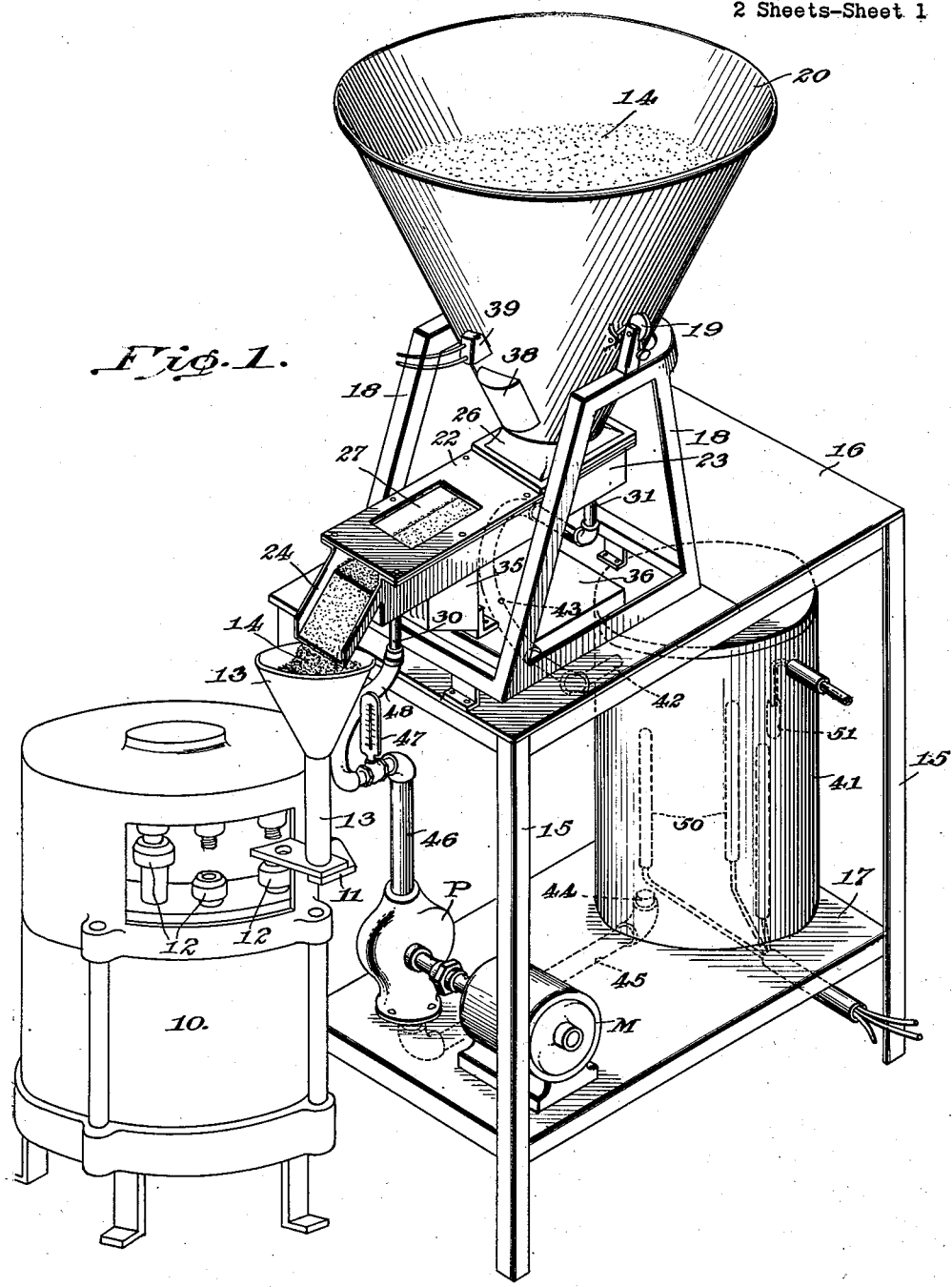
Fig. 1 is a perspective view of an apparatus for preheating moldable materials which is constructed in accordance with the principles of the invention and shows the same operatively associated with a conventional molding machine.

Referring now to Fig. 1, a conventional molding machine 10 is provided with a feeding device 11 for the molds 12 thereof. A feeder hopper 13 is adapted to receive therein the preheated moldable material 14 for transfer in segregated amounts by the feeding device 11 to the molds 12.

The apparatus for preheating the moldable material 14 prior to delivery thereof to the hopper 13 comprises a table-like structure having supporting legs 15 between which are supported an upper platform 16 and a lower platform 17. A frame-like cradle 18 secured to the upper platform 16 has suspended therein by means of adjustable floating hangers, one of which is shown at 19, a supply hopper 20 which is of funnel-shape design. The lower end of the hopper 20 extends through an opening 21 (Fig. 2) provided in the cover member 22 of an elongated conveyor-trough 23, the forward open end of which is provided with a forwardly and downwardly extending chute 24 by means of which the moldable material 14 is introduced by gravity into the feeder hopper 13. The bottom 25 of the conveyor-trough 23 is substantially level and, upon agitation of the conveyor-trough in a manner subsequently to be described, the material fed onto the same by the hopper 20 adjacent the rear end thereof travels forwardly on the bottom 25. If desired, the bottom of the conveyor-trough may be slightly inclined forwardly and downwardly as a further aid in causing progressive movement of the material on the same. An apron 26 or dust guard having its lower edge secured to the cover member 22 and its upper edge secured to the hopper 20 surrounds the opening 21. A glass sealed inspection opening 27 is provided on the cover member 22.

Welded or otherwise secured to the underneath side of the conveyor-trough 23 and coextensive therewith so as to form a liquid-tight heating chamber 28, is a comparatively shallow trough-like shell 29 having an inlet connection 30 and an outlet connection 31 in the bottom thereof for ingress and egress of a suitable heating fluid 32 such as water, oil, glycerine or a glycerine derivative such as ethylene glycol or the like. A series of staggered baffles 33 (Fig. 3) that extend transversely of the chamber 28 serve to increase the distance of flow of the heating fluid through the chamber and thus increase the effectiveness of the fluid in heating the bottom 25 of the conveyor-trough 23.

In order to cause the moldable material 14 to be moved along the bottom 25 of the conveyor-trough 23 from the hopper 20 to the chute 24, means is provided for agitating the entire unit 23, 29. Toward this end, the shell 29 is connected to and is in part supported by the vibrator element 34 of an electro-magnetic vibrator 35 which is secured to a supporting block 36 mounted on the upper platform 16. A flexible strut 37 extending between the block 36 and the shell 29 aids in supporting the unit. A similar electro-magnetic vibrator 38 is connected to the supply trough 20 to insure uniform flow of the moldable material 14 therefrom onto the bottom 25 of the conveyor-trough 23. By varying the frequency and/or amplitude of the impulses emitted by the vibrator 35, accurate gravimetric control of the material being fed to the feeder hopper 13 may be obtained. The vibrator 35 is so designed that the vibrations imparted to the conveyor-trough 23 causes the trough, within the limits of its vibration, to move forwardly and upwardly in one direction and rearwardly and downwardly in the other direction, thus imparting to the particles of moldable material on the bottom 25 of the conveyor-trough 23 a pitching movement whereby they are constantly agitated and impelled forwardly on the conveyor bottom.

A photo-electric cell 39 and an energizing lamp 40 therefor positioned in the supply hopper 20 on opposite sides thereof, cooperate with each other in giving a visible or audible signal when the level of moldable material in the hopper falls below the level of these instrumentalities.

A supply tank 41 (Fig. 1) adapted to contain a supply body of the heating fluid 32 is mounted on the lower platform 17 and is provided with a fluid inlet connection 42 which is connected by a flexible conduit 43 to the fluid outlet connection 31 of the heating chamber 28. The tank 41 is provided with a fluid outlet connection 44 which is connected by a conduit 45 to the inlet side of a fluid pump P mounted on the lower platform 17. The pump outlet is provided with a connection 46 having a temperature indicator 47 therein and connected by a flexible connection 48 to the inlet connection 30 of the heating chamber 28. The pump P is adapted to be driven by an electric motor M mounted on the lower platform 17. It will be seen that when the pump P is in operation, the heating fluid 32 will be forced under pressure through a continuous closed circuit and will pass from the bottom of the supply tank 41 through the connections 44, 45, pump P, connections 46, 48, heating chamber 28, and connections 31, 43, 42, to the upper end of the supply tank 41.

A plurality of heating elements 50 disposed within the supply tank 41 serve to heat the fluid therein, the operation of the elements 50 being controlled by a thermostat 51 designed to regulate the temperature of the fluid in the tank.

The electrical circuits for controlling the operation of the heating elements 50 are diagrammatically illustrated in Fig. 4. The heating elements 50 are connected in parallel through wires $a$, $b$, a double pole electromagnetically controlled switch $S^1$, wires $c$, $d$, and main operating switch $S^2$ to a source of current supply B. The switch $S^1$ is normally open but is adapted to become closed upon energization of its coil C. One terminal of the coil C is connected through a wire $e$ to a pilot switch $S^3$ which is actuated by the thermostat 51. The switch $S^3$ is connected to the source B through wires $i$, $d$, and switch $S^2$. The other terminal of the coil C is connected to the source B through wires $f$, $c$, and switch $S^2$.

Upon closing of the switch $S^2$, if the temperature of the heating fluid in the supply tank 41 is below a predetermined minimum, current from the source B passes through the switch $S^2$, wires $c$, $f$, coil C, wire $e$, switch $S^3$, wires $i$, $d$, and switch $S^2$ back to the source B. The coil C is thus energized and the switch $S^1$ becomes closed thereby supplying current from the source B directly to the heating units 50 in the manner previously indicated. The heating fluid in the tank 41 is thus raised to the predetermined temperature whereupon the thermostat 51 causes the pilot switch $S^3$ to become open to de-energize the coil C and shut off the supply of current to the heating units 50.

An adjusting means 60 is provided for advancing or retarding the opening and closing of the thermostat controlled switch $S^3$ to vary the temperature to which the heating fluid must be heated in the tank 41 before this switch will become actuated.

Moldable material 14 fed by the supply chute 29 to the bottom 25 of the vibrating conveyor-trough 23 adjacent the rear end thereof is spread out in the form of a thin blanket and travels uniformly forwardly on the trough and in so traveling is agitated and evenly distributed thereover. Heat conducted through the relatively thin metal bottom 25 and radiated therefrom is assimilated by the particles of the material 14. It is to be noted that the heating fluid 32 enters the chamber 28 adjacent the forward end thereof and thus as it yields heat to the particles of material 14 on the bottom 25, it becomes progressively cooler toward the rear end of the chamber. Thus the relatively cold material is deposited on the bottom 25 in the cooler regions thereof and is progressively heated as it advances. By such an arrangement, uniform heating up to the desired temperature is attained and scorching of the particles is prevented.

It is to be noted that the hottest particles leaving the discharge end of the conveyor-trough 23 are deposited directly in the feeder hopper 13 in which they are permitted to pile up to such an extent that the feeder hopper acts in the manner of a soaking pit. Thus during an interval immediately prior to introduction of the moldable material to the molds of the molding machine an exchange of heat between the various adjacent particles in the hopper 13 takes place until an equalized temperature condition obtains therein.

By the provision of an apparatus which will, in the manner herein described, preheat powdered or granulated moldable materials prior to their introduction to and treatment in the molds of a molding machine, the duration of the molding cycle is greatly reduced thus materially increasing the molding rate. For example, in the molding of plastic bottle caps from phenolitic or urea resins, it has been found that by preheating the moldable material according to the principles of the invention and with the apparatus herein described, the normal production rate of from 20 to 24 caps per minute is increased to from 35 to 40 caps per minute.

Modifications may be resorted to within the spirit and scope of the appended claim.

I claim:

In the molding of granular synthetic resins the method which consists in so heating a substantially horizontal flat plate that the temperature thereof increases progressively from one end to the other, flowing granular moldable material onto the relatively cool end of the plate, vibrating the plate to cause movement of the moldable material in a continuous thin layer of substantially uniform thickness over the upper surface of the plate in a direction towards the zone of higher temperature, automatically discharging and piling the material following heating thereof and transferring measured quantities of the material from said pile to forming molds.

STEPHEN T. MORELAND.